US011342857B2

(12) United States Patent
Kikuchi

(10) Patent No.: US 11,342,857 B2
(45) Date of Patent: May 24, 2022

(54) SYNCHRONOUS RECTIFICATION CONTROLLER AND ISOLATED SYNCHRONOUS RECTIFICATION TYPE DC/DC CONVERTER

(71) Applicant: Rohm Co., Ltd., Kyoto (JP)

(72) Inventor: Hiroki Kikuchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 24 days.

(21) Appl. No.: 16/902,413

(22) Filed: Jun. 16, 2020

(65) Prior Publication Data

US 2020/0403520 A1 Dec. 24, 2020

(30) Foreign Application Priority Data

Jun. 18, 2019 (JP) .............................. JP2019-112639

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ........................... H02M 3/33592; H02M 1/08
See application file for complete search history.

(56) References Cited

U.S. PATENT DOCUMENTS

| 10,170,973 | B1* | 1/2019 | Hirose | H02M 7/217 |
| 10,615,700 | B1* | 4/2020 | Moon | H02M 1/38 |
| 2016/0036339 | A1* | 2/2016 | Kikuchi | H02M 3/33523 363/21.14 |
| 2018/0006569 | A1* | 1/2018 | Kikuchi | G05F 1/618 |

FOREIGN PATENT DOCUMENTS

JP 2009-159721 7/2009

* cited by examiner

*Primary Examiner* — Alex Torres-Rivera
(74) *Attorney, Agent, or Firm* — Fish & Richardson P.C.

(57) ABSTRACT

A synchronous rectification controller that controls driving a synchronous rectification transistor arranged on secondary side, includes: a gate terminal being electrically connectable to a gate of the synchronous rectification transistor; a drain terminal being electrically connectable to a drain of the synchronous rectification transistor via a first resistor; a first comparator comparing a drain terminal voltage generated at the drain terminal with negative first threshold voltage; a second comparator comparing the drain terminal voltage with negative second threshold voltage higher than the first threshold voltage; and a driver performing on/off control of the synchronous rectification transistor based on result of the comparison by the first comparator and result of the comparison by the second comparator, wherein when the synchronous rectification transistor is turned on, voltage is added to the drain terminal voltage by current flowing through the first resistor according to a second resistor.

19 Claims, 12 Drawing Sheets

SYNCHRONOUS RECTIFICATION CONTROLLER AND ISOLATED SYNCHRONOUS RECTIFICATION TYPE DC/DC CONVERTER

CROSS-REFERENCE TO RELATED APPLICATION

This application is based upon and claims the benefit of priority from Japanese Patent Application No. 2019-112639, filed on Jun. 18, 2019, the entire contents of which are incorporated herein by reference.

TECHNICAL FIELD

The present disclosure relates to a synchronous rectification controller and an isolated synchronous rectification type DC/DC converter including the same.

BACKGROUND

Isolated DC/DC converters are used in various power supply circuits such as AC/DC converters. An isolated DC/DC converter includes a fly-back converter, an LLC converter, and the like.

For example, a fly-back converter includes a diode rectification type converter and a synchronous rectification type converter (an example of the synchronous rectification type converter is disclosed in the related art). In the diode rectification type converter, a loss occurs in a diode due to a forward voltage of the diode and a current flowing through the diode. On the other hand, in the synchronous rectification type converter, a loss occurs in a synchronous rectification transistor due to the on-resistance of the synchronous rectification transistor and a current flowing through the synchronous rectification transistor, and the loss can be greatly reduced as compared to the diode rectification type converter.

However, in the synchronous rectification type converter, when the synchronous rectification transistor is turned on, a current starts to flow in the synchronous rectification transistor, but it is desirable to turn off the synchronous rectification transistor before the current flows backward. A backflow margin is defined by how much a turn-off timing of the synchronous rectification transistor is separated before the timing when the current starts to flow backward (that is, a zero-cross timing), and it is desirable to appropriately secure the backflow margin.

SUMMARY

Some embodiments of the present disclosure provide a synchronous rectification controller capable of properly ensuring a backflow margin, and an isolated synchronous rectification type DC/DC converter including the same.

According to an embodiment of the present disclosure, there is provided a synchronous rectification controller that controls driving a synchronous rectification transistor arranged on a secondary side, including: a gate terminal configured to be capable of being electrically connected to a gate of the synchronous rectification transistor; a drain terminal configured to be capable of being electrically connected to a drain of the synchronous rectification transistor via a first resistor; a first comparator configured to compare a drain terminal voltage generated at the drain terminal with a negative first threshold voltage; a second comparator configured to compare the drain terminal voltage with a negative second threshold voltage higher than the first threshold voltage; and a driver configured to perform an on/off control of the synchronous rectification transistor based on a result of the comparison by the first comparator and a result of the comparison by the second comparator, wherein when the synchronous rectification transistor is turned on, a voltage is added to the drain terminal voltage by a current flowing through the first resistor according to a second resistor.

In some embodiments, a first end of the second resistor may be configured to be capable of being electrically connected to the gate terminal, and a second end of the second resistor may be electrically connected between the first resistor and the drain terminal.

In some embodiments, the gate terminal may be configured to be capable of being connected to a first end of a third resistor, a second end of the third resistor may be connected to the gate, and the first end of the second resistor may be electrically connected between the gate and the third resistor.

In some embodiments, a cathode of a first Zener diode may be connected between the gate and the third resistor, and the anode of the first Zener diode may be connected to the first end of the second resistor.

In some embodiments, the gate terminal may be configured to be capable of being connected to a first end of a third resistor, a second end of the third resistor may be connected to the gate, and the first end of the second resistor may connected between the third resistor and the gate terminal.

In some embodiments, the second end of the second resistor may be connected to an anode of a first diode, and a cathode of the first diode may be connected between the first resistor and the drain terminal.

In some embodiments, a first end of an external capacitor may be connected between the first resistor and the drain terminal.

In some embodiments, the synchronous rectification controller may further includes: a resistor terminal connectable to a first end of the second resistor; an error amplifier including a first input terminal to which a reference voltage is applied; a transistor including a control end to which an output end of the error amplifier is connected, and a first end connected to the resistor terminal together with a second input end of the error amplifier; and a current mirror configured to cause a current corresponding to a current flowing through the transistor to flow through the first resistor through the drain terminal.

According to another embodiment of the present disclosure, there is provided an isolated synchronous rectification type DC/DC converter including: the synchronous rectification controller; the synchronous rectification transistor; the first resistor; and the second resistor.

In some embodiments, isolated synchronous rectification type DC/DC converter may be an LLC converter or a fly-back converter

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Some embodiments of the present disclosure will be now described with reference to the drawings.

1. First Embodiment

First, a first embodiment of the present disclosure will be described. The first embodiment is an example in which the present disclosure is applied to an LLC converter.

1-1. Overall Configuration of LLC Converter

Figure 1:
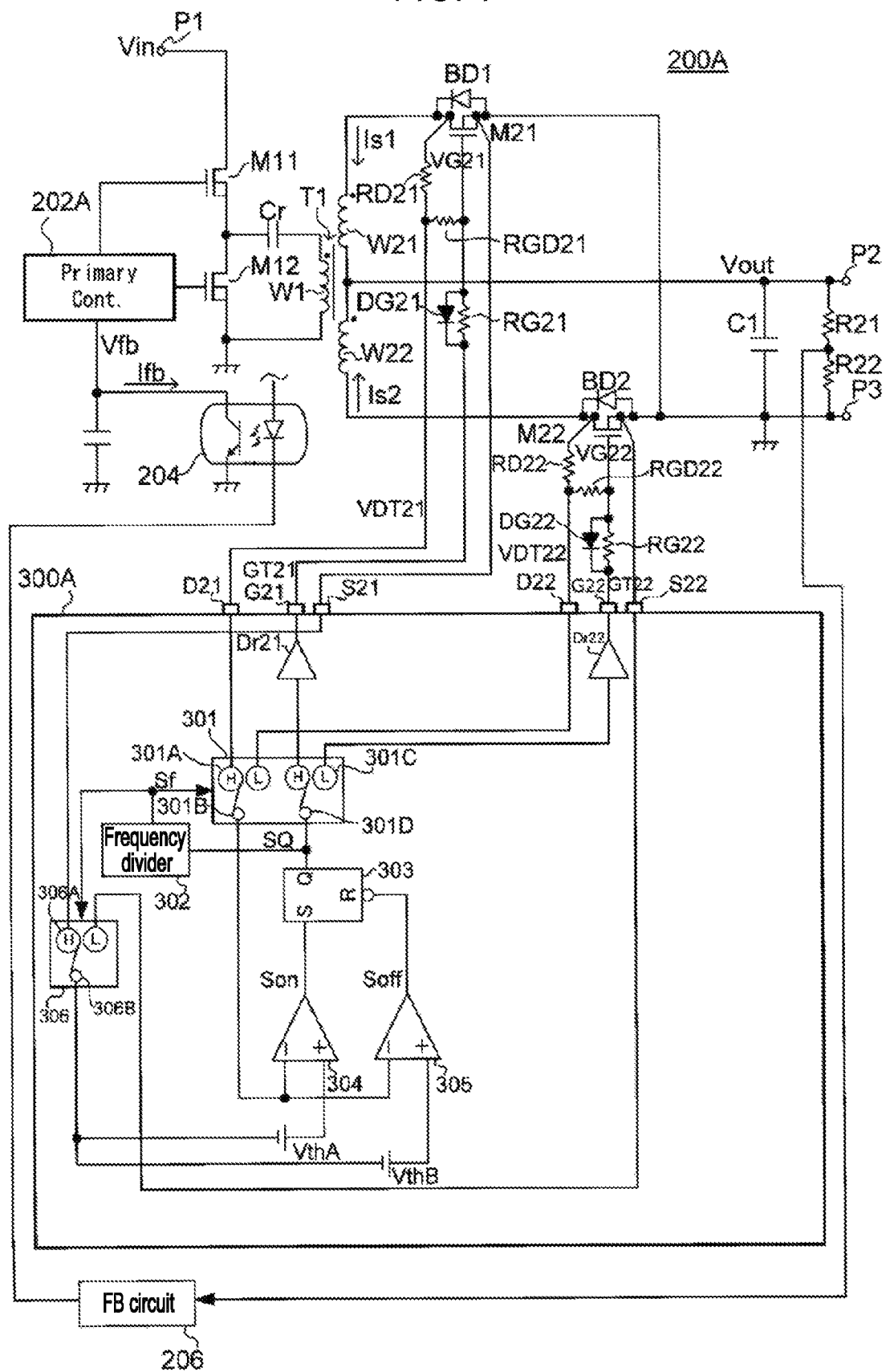
FIG. 1 is a circuit diagram of a DC/DC converter according to a first embodiment of the present disclosure.

FIG. 1 is a circuit diagram of a DC/DC converter 200A according to the first embodiment. The DC/DC converter 200A is an isolated synchronous rectification type DC/DC converter as an LLC converter. The DC/DC converter 200A generates an output voltage Vout based on an input voltage Vin applied to an input terminal P1, and outputs the output voltage Vout from an output terminal P2.

The DC/DC converter 200A includes switching transistors M11 and M12, a primary side controller 202A, a resonance capacitor Cr, and a primary winding W1 of a transformer T1 as a primary side configuration, and secondary windings W21 and W22 of the transformer T1, a first synchronous rectification transistor M21, a second synchronous rectification transistor M22, an output capacitor C1, resistors R21 and R22, and a synchronous rectification controller 300A as a secondary side configuration. The switching transistors M11 and M12 both include n-channel MOSFETs. Further, both the first synchronous rectification transistor M21 and the second synchronous rectification transistor M22 also include n-channel MOSFETs.

A drain of the switching transistor M11 is connected to an input terminal P1 to which a DC input voltage Vin is applied. A source of the switching transistor M11 is connected to a drain of the switching transistor M12. A source of the switching transistor M12 is connected to a grounded end. One end of a resonance capacitor Cr is connected to a connection node at which the switching transistor M11 and the switching transistor M12 are connected. The other end of the resonance capacitor Cr is connected to one end of the primary winding W1. The other end of the primary winding W1 is connected to the source of the switching transistor M12.

The primary side controller 202A controls switching of the switching transistors M11 and M12 by outputting a drive signal to the gates of the switching transistors M11 and M12.

One end of the secondary winding W21 is connected to the drain of the first synchronous rectification transistor M21. The first synchronous rectification transistor M21 includes a body diode BD1. The source of the first synchronous rectification transistor M21 is connected to a ground terminal P3. The ground terminal P3 is connected to the grounded end.

The other end of the secondary winding W21 is connected to one end of the secondary winding W22. The other end of the secondary winding W22 is connected to the drain of the second synchronous rectification transistor M22. The second synchronous rectification transistor M22 includes a body diode BD2. The source of the second synchronous rectification transistor M22 is connected to the ground terminal P3.

A connection node connecting the secondary winding W21 and the secondary winding W22 is connected to the output terminal P2. The output capacitor C1 is connected between the output terminal P2 and the ground terminal P3. Further, the resistor R21 and the resistor R22 are connected in series between the output terminal P2 and the ground terminal P3. An FB (feedback) circuit 206 is connected to a connection node to which the resistors R21 and R22 are connected.

The FB circuit 206 includes, for example, a shunt regulator and the like, and drives a light emitting element of a photo-coupler 204 with a current according to an error between a voltage after the output voltage Vout is divided by the resistors R21 and R22 and a predetermined target voltage. A feedback current Ifb according to the error flows through a light receiving element of the photo-coupler 204. A feedback signal Vfb corresponding to the feedback current Ifb is generated at an FB (feedback) pin of the primary side controller 202A, and the primary side controller 202A drives the switching transistors M11 and M12 based on the feedback signal Vfb.

The synchronous rectification controller 300A includes a selector 301, a frequency divider 302, a flip-flop 303, a first comparator 304, a second comparator 305, a selector 306, a first driver Dr21, and a second driver Dr22 in a single semiconductor package.

Further, the synchronous rectification controller 300A includes a first drain terminal D21, a first gate terminal G21, a first source terminal S21, a second drain terminal D22, a second gate terminal G22, and a second source terminal S22 for establishing an electrical connection with the outside.

The drain of the first synchronous rectification transistor M21 is connected to a first end of a resistor RD21. A second end of the resistor RD21 is connected to the first drain terminal D21. The first drain terminal D21 is connected to one terminal of an input end 301A of the selector 301. The drain of the second synchronous rectification transistor M22 is connected to a first end of the resistor RD22. The second end of the resistor RD22 is connected to the second drain terminal D22. The second drain terminal D22 is connected to the other terminal of the input end 301A. An output end 301B of the selector 301 is connected to an inverting input terminal (−) of each of the first comparator 304 and the second comparator 305. The selector 301 switches between conduction of a path from the first drain terminal D21 to the output end 301B and conduction of a path from the second drain terminal D22 to the output end 301B. That is, the selector 301 selects either a first drain terminal voltage VDT21 of the first drain terminal D21 or a second drain terminal voltage VDT22 of the second drain terminal D22 as a detection target of the first comparator 304 and the second comparator 305.

A negative first threshold voltage VthA is applied to a non-inverting input terminal (+) of the first comparator 304. An output end 306B of the selector 306 becomes a reference potential of the first threshold voltage VthA. One terminal at an input end 306A of the selector 306 is connected to the first source terminal S21, and the other terminal of the input end 306A is connected to the second source terminal S22. When the first source terminal S21 and the output end 306B are electrically connected by the selector 306, the first threshold voltage VthA is based on a potential of the first source terminal S21, and when the second source terminal S22 and the output end 306B are electrically connected by the selector 306, the first threshold voltage VthA is based on a potential of the second source terminal S22. The output end of the first comparator 304 is connected to a set terminal of the flip-flop 303.

When the drain terminal voltages VDT21 and VDT22 become lower than the first threshold voltage VthA (for example, −200 mV), the first comparator 304 detects that the drain terminal voltages VDT21 and VDT22 decrease to a negative voltage due to the turn-on of the switching transistors M11 and M12. At this time, the first comparator 304 asserts an on-signal Son. The first synchronous rectification transistor M21 and the second synchronous rectification transistor M22 are turned on by the asserted on-signal Son.

A negative second threshold voltage VthB higher than the first threshold voltage VthA is applied to the non-inverting input terminal (+) of the second comparator 305. The output end 306B of the selector 306 becomes a reference potential of the second threshold voltage VthB. When the first source terminal S21 and the output end 306B are electrically connected by the selector 306, the second threshold voltage VthB is based on the potential of the first source terminal S21, and when the second source terminal S22 and the output end 306B are electrically connected by the selector 306, the second threshold voltage VthB is based on the potential of the second source terminal S22. The output end of the second comparator 305 is connected to a reset terminal of the flip-flop 303. When the drain terminal voltages VDT21 and VDT22 become higher than the second threshold voltage VthB (for example, −6 mV), the second comparator 305 detects a zero current at which currents Is1 and Is2 flowing through the turned-on first synchronous rectification transistor M21 and second synchronous rectification transistor M22 are substantially zero. At this time, the second comparator 305 asserts an off-signal Soff. The first synchronous rectification transistor M21 and the second synchronous rectification transistor M22 are turned off by the asserted off-signal Soff.

Since the second threshold voltage VthB is based on the potential of the first source terminal S21, the drain terminal voltage VDT21 based on a source, which is not affected by parasitic impedance between the ground and the first synchronous rectification transistor M21 when the first synchronous rectification transistor M21 is turned on, can be used for detection. Similarly, since the second threshold voltage VthB is based on the potential of the second source terminal S22, the drain terminal voltage VDT22 based on a source, which is not affected by parasitic impedance between the ground and the second synchronous rectification transistor M22 when the second synchronous rectification transistor M22 is turned on, can be used for detection.

Figure 2:
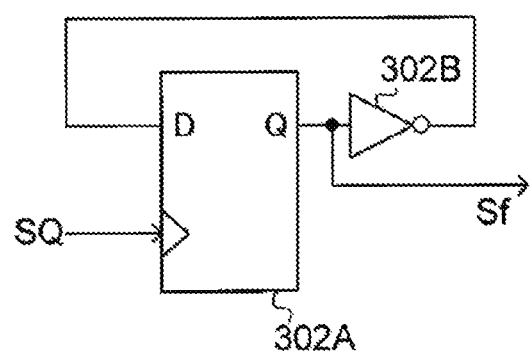
FIG. 2 is a view showing a configuration example of a frequency divider included in a synchronous rectification controller according to the first embodiment.

A Q output terminal of the flip-flop 303 is connected to the input end of the frequency divider 302. The frequency divider 302 has, for example, a configuration shown in FIG. 2 and includes a D flip-flop 302A and an inverter 302B. A Q output signal SQ from the flip-flop 303 is input to a clock terminal of the D flip-flop 302A. An input end of the inverter 302B is connected to a Q output terminal of the D flip-flop 302A. An output end of the inverter 302B is connected to a D input terminal of the D flip-flop 302A.

With such a configuration, a frequency divider output signal Sf, which is output from the Q output terminal of the D flip-flop 302A, switches between high and low at each falling timing of the Q output signal SQ from high to low. The frequency divider 302 outputs the frequency divider output signal Sf which is double the cycle of the input Q output signal SQ.

The frequency divider output signal Sf is output to the selector 301. The selector 301 switches between the input end 301A and the output end 301B, and switches between an input end 301D and an output end 301C according to a level of the frequency divider output signal Sf. The input end 301D is connected to the Q output terminal of the flip-flop 303.

One terminal at the output end 301C is connected to an input end of the first driver Dr21. An output end of the first driver Dr21 is connected to the first gate terminal G21. The first gate terminal G21 is connected to a first end of a resistor RG21. A second end of the resistor RG21 is connected to the gate of the first synchronous rectification transistor M21. The cathode of a diode DG21 is connected to the first end of the resistor RG21. The anode of the diode DG21 is connected to the second end of the resistor RG21.

The first driver Dr21 outputs a gate terminal voltage GT21 whose level is switched according to a level of an input signal. When the gate terminal voltage GT21 rises steeply, a gate voltage VG21 applied to the gate of the first synchronous rectification transistor M21 by the resistor RG21 rises gently. When the gate terminal voltage GT21 falls steeply, the gate voltage VG21 also falls steeply due to the diode DG21.

The other terminal of the output end 301C is connected to an input end of the second driver Dr22. An output end of the second driver Dr22 is connected to the second gate terminal G22. The second gate terminal G22 is connected to a first end of a resistor RG22. A second end of the resistor RG22 is connected to a gate of the second synchronous rectification transistor M22. A cathode of a diode DG22 is connected to a first end of the resistor RG22. An anode of the diode DG22 is connected to a second end of the resistor RG22.

The second driver Dr22 outputs a gate terminal voltage GT22 whose level is switched according to a level of an input signal. When the gate terminal voltage GT22 rises steeply, a gate voltage VG22 applied to the gate of the second synchronous rectification transistor M22 by the resistor RG22 rises gently. When the gate terminal voltage GT22 falls steeply, the gate voltage VG22 also falls steeply due to the diode DG22.

The selector 301 switches between conduction of a path from the Q output end of the flip-flop 303 to the first driver Dr21 and conduction of a path from the Q output end of the flip-flop 303 to the second driver Dr22.

The frequency divider output signal Sf is also output to the selector 306. The selector 306 switches conduction between the input end 306A and the output end 306B according to a level of the frequency divider output signal Sf.

In the present embodiment, a first end of a resistor RGD21 is connected between the second end of the resistor RG21 and the gate of the first synchronous rectification transistor M21, and a second end of the resistor RGD21 is connected between the second end of the resistor RD21 and the first drain terminal D21. In addition, a first end of a resistor RGD22 is connected between the second end of the resistor RG22 and the gate of the second synchronous rectification transistor M22, and a second end of the resistor RGD22 is connected between the second end of the resistor RD22 and the second drain terminal D22. The reason for providing such resistors RGD21 and RGD22 will be described later.

1-2. Basic Operation of LLC Converter

Figure 3:
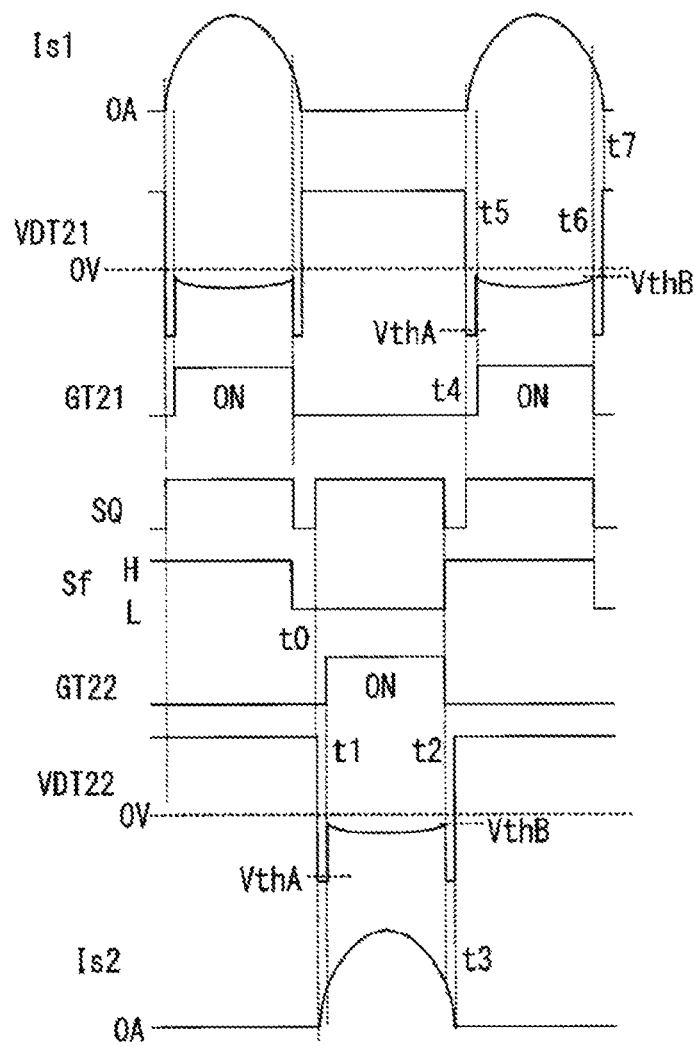
FIG. 3 is a timing chart showing an operation example of the DC/DC converter according to the first embodiment.

Next, an operation of the DC/DC converter 200A thus configured will be described with reference to a timing chart shown in FIG. 3. Further, FIG. 3 shows an example of a load current. In addition, the drain terminal voltages VDT21 and VDT22 shown in FIG. 3 schematically show waveforms for the sake of convenience, and more specific waveforms will be described later.

Before timing t0, the frequency divider output signal Sf has a low level, and the selector 301 selects the drain terminal voltage VDT22 of the second drain terminal D22 as a detection target, and selects the second driver Dr22 as an output destination of the Q output signal SQ. Further, the selector 306 selects the potential of the second source terminal S22 as the reference potential of the first threshold voltage VthA and the second threshold voltage VthB.

Then, at timing t0, when the switching transistor M11 is turned on, the current Is2 begins to flow through the body diode BD2 of the second synchronous rectification transistor M22, the first comparator 304 detects that the drain terminal voltage VDT22 has dropped to a negative voltage, and the on-signal Son is asserted. Thus, the Q output signal SQ is switched to a high level, the second driver Dr22 sets the gate terminal voltage GT22 to an on level, and the second synchronous rectification transistor M22 is turned on at timing t1. Therefore, the current Is2 begins to flow from the source to the drain side of the second synchronous rectification transistor M22.

The current Is2 is a resonance current and has a sinusoidal wave shape. Then, at timing t2, the second comparator 305 detects that the current Is2 becomes a zero current based on the drain terminal voltage VDT22, and the off-signal Soff is asserted. Thus, the Q output signal SQ is switched to a low level, the gate terminal voltage GT22 becomes an off level, and the second synchronous rectification transistor M22 is turned off. At this time, the frequency divider output signal Sf is switched to a high level. Thus, the selector 301 selects the drain terminal voltage VDT21 of the first drain terminal D21 as the detection target and selects the first driver Dr21 as the output destination of the Q output signal SQ. Further, the selector 306 selects the potential of the first source terminal S21 as the reference potential of the first threshold voltage VthA and the second threshold voltage VthB.

In the turned-off second synchronous rectification transistor M22, the current Is2 continues to flow through the body diode BD2, and the current Is2 stops flowing at timing t3.

Then, at timing t4, when the switching transistor M12 is turned on, the current Is1 begins to flow through the body diode BD1 of the first synchronous rectification transistor M21, the first comparator 304 detects that the drain terminal voltage VDT21 decreases to a negative voltage, and the on-signal Son is asserted. Thus, the Q output signal SQ is switched to a high level, the first driver Dr21 sets the gate terminal voltage GT21 to an on level, and the first synchronous rectification transistor M21 is turned on at timing t5. Therefore, the current Is1 begins to flow from the source side to the drain side of the first synchronous rectification transistor M21.

The current Is1 is a resonance current and has a sinusoidal wave shape. Then, at timing t6, the second comparator 305 detects that the current Is1 has become a zero current based on the drain terminal voltage VDT21, and the off-signal Soff is asserted. Thus, the Q output signal SQ is switched to a low level, the gate terminal voltage GT21 becomes an off level, and the first synchronous rectification transistor M21 is turned off. At this time, the frequency divider output signal Sf is switched to a low level. Thus, the selector 301 selects the drain terminal voltage VDT22 of the second drain terminal D22 as the detection target and selects the second driver Dr22 as the output destination of the Q output signal SQ. Further, the selector 306 selects the potential of the second source terminal S22 as the reference potential of the first threshold voltage VthA and the second threshold voltage VthB.

In the first synchronous rectification transistor M21 that has been turned off, the current Is1 continues to flow through the body diode BD1, and the current Is1 stops flowing at timing t7. Thereafter, the same repeated operation is performed.

1-3. Comparative Example

Figure 4:
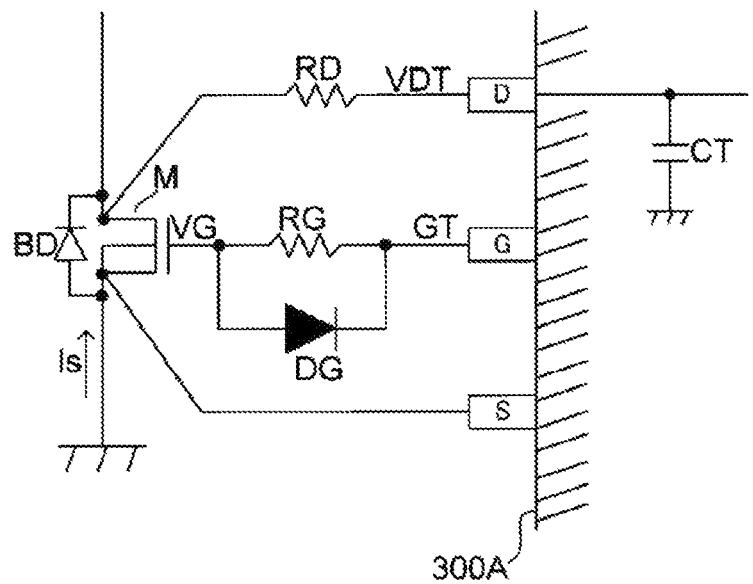
FIG. 4 is a view showing a configuration around a synchronous rectification transistor according to a comparative example.

Here, on/off control of a synchronous rectification transistor in a comparative example for comparison with the configuration according to the present embodiment will be described. FIG. 4 shows a configuration around a synchronous rectification transistor M according to the comparative example. Since the configuration of FIG. 4 is common to both of the synchronous rectification transistors M21 and M22 (FIG. 1), numbers such as "21" and "22" are omitted from the reference numerals of the elements in FIG. 4. Further, FIG. 4 shows a drain terminal D, a gate terminal G, and a source terminal S included in the synchronous rectification controller 300A. Further, in the configuration of FIG. 4 according to the comparative example, a resistor RGD (RGD21 and RGD22 of FIG. 1) is not provided, due to a difference in the configuration according to the present embodiment.

Figure 5:
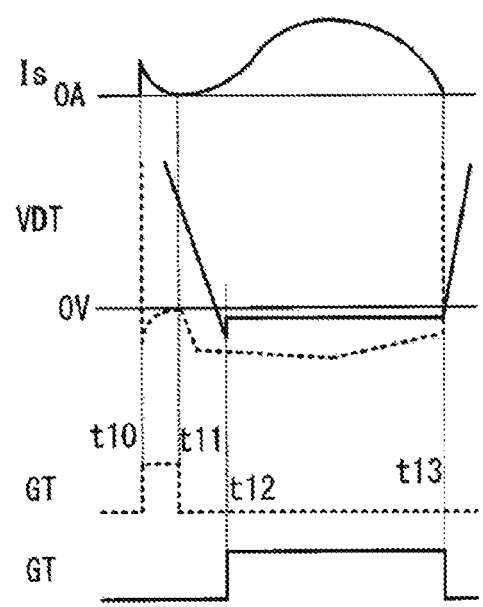
FIG. 5 is a timing chart showing an example of on/off control of the synchronous rectification transistor in the configuration according to the comparative example (in the case of a light load).

FIG. 5 is a timing chart showing an example of on/off control of the synchronous rectification transistor M in the configuration according to the comparative example shown in FIG. 4. FIG. 5 shows a behavior in the case of a light load. FIG. 5 shows a current Is, a drain terminal voltage VDT, and a gate terminal voltage GT in order from the top.

Here, as shown in FIG. 4, a terminal capacitor CT connected to the drain terminal D is built in the synchronous rectification controller 300A. Thus, an RC circuit (low pass filter) including a resistor RD and the terminal capacitor CT and having the drain voltage of the synchronous rectification transistor M as an input and the drain terminal voltage VDT as an output is formed.

When the resistance RD is small, as indicated by a broken line in FIG. 5, at timing t10, the drain terminal voltage VDT falls relatively steeply to a negative voltage, and the current Is begins to flow. When it is detected that the drain terminal voltage VDT falls and becomes lower than the first threshold voltage VthA (FIG. 1), the gate terminal voltage GT (broken line) rises to a high level. Thus, the synchronous rectification transistor M is turned on.

Thereafter, since the current Is approaches zero, the drain terminal voltage VDT rises toward 0V, and when the drain terminal voltage VDT becomes higher than the second threshold voltage VthB (FIG. 1) at timing t11, the gate terminal voltage GT falls to a low level. Thus, the synchronous rectification transistor M is turned off.

In this way, when the resistance RD is small and the load is a light load, the synchronous rectification transistor M is turned off immediately after being turned on, and the current Is then flows through the body diode BD of the synchronous rectification transistor M, resulting in a large loss.

Therefore, when the resistance RD is large, the drain terminal voltage VDT falls relatively smoothly to a negative voltage as indicated by a solid line in FIG. 5. Thus, the fall of the drain terminal voltage VDT is detected at timing t12 after timing t11, the gate terminal voltage GT (solid line) rises, and the synchronous rectification transistor M is turned on.

Since the current Is rises and then falls after timing t12, the drain terminal voltage VDT is maintained at a negative voltage, it is detected at timing t13 that the drain terminal voltage VDT becomes higher than the second threshold voltage VthB, and the gate terminal voltage GT falls. Thus, the synchronous rectification transistor M is turned off.

In this way, when the resistance RD is large, even when the load is a light load, the turn-off timing of the synchronous rectification transistor M can be optimized and the loss can be suppressed.

Figure 6:
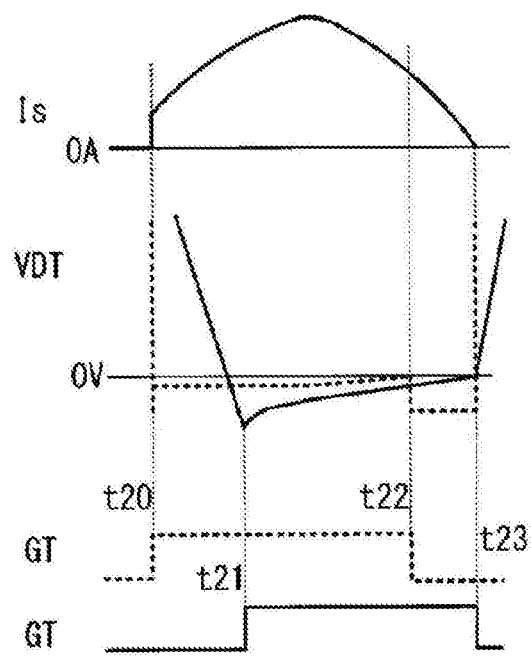
FIG. 6 is a timing chart showing an example of on/off control of the synchronous rectification transistor in the configuration according to the comparative example (in the case of a heavy load).

On the other hand, FIG. 6 is a timing chart showing an example of on/off control of the synchronous rectification transistor M in the configuration according to the comparative example shown in FIG. 4 when the load is a heavy load.

When the resistance RD is small, at timing t20, the drain terminal voltage VDT falls relatively steeply to a negative voltage as indicated by a broken line in FIG. 6, and the current Is begins to flow. When it is detected that the drain terminal voltage VDT falls and becomes lower than the first threshold voltage VthA (FIG. 1), the gate terminal voltage GT (broken line) rises to a high level. Thus, the synchronous rectification transistor M is turned on. Then, the drain terminal voltage VDT steeply approaches the 0V side and then changes to a negative voltage according to the current Is that falls after rising, and the drain terminal voltage VDT becomes higher than the second threshold voltage VthB at timing t22. Then, the gate terminal voltage GT (broken line) falls to a low level. Thus, the synchronous rectification transistor M is turned off.

On the other hand, when the resistance RD is large, the drain terminal voltage VDT falls relatively smoothly to a negative voltage as indicated by a solid line in FIG. 6. Thus, the fall of the drain terminal voltage VDT is detected at timing t21 after timing t20, the gate terminal voltage GT (solid line) rises, and the synchronous rectification transistor M is turned on. Then, the drain terminal voltage VDT changes to a negative voltage according to the current Is that falls after rising, and the drain terminal voltage VDT becomes higher than the second threshold voltage VthB at timing t23. Then, the gate terminal voltage GT (solid line) falls to a low level. Thus, the synchronous rectification transistor M is turned off.

In this way, in the case where the resistance RD is large, as described above, it is advantageous when the load is a light load, but when the load is a heavy load, the timing at which the synchronous rectification transistor M is turned off approaches the timing at which the current Is begins to flow backward (that is, the zero-cross timing). That is, a backflow margin is reduced.

1-4. Present Embodiment

Figure 7:
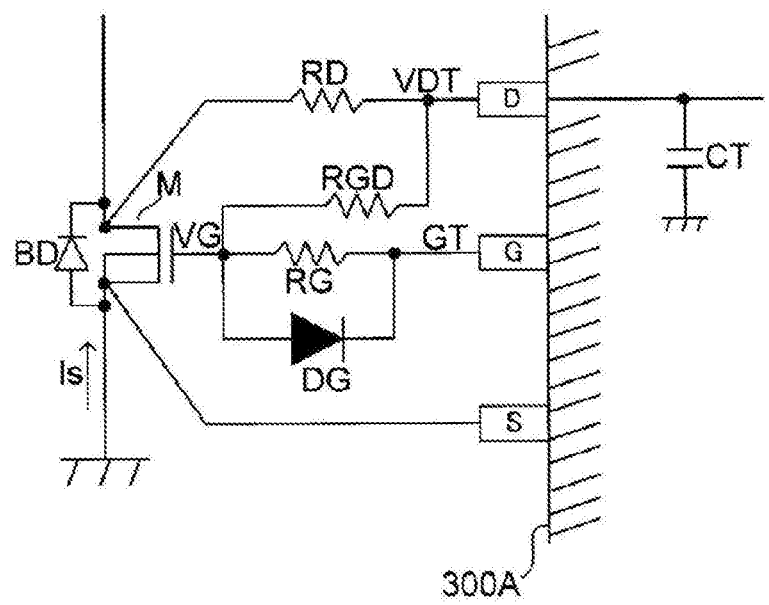
FIG. 7 is a view showing a configuration around the synchronous rectification transistor according to the first embodiment.

FIG. 7 shows a configuration around the synchronous rectification transistor M according to the present embodiment. FIG. 7 is different from FIG. 4 (comparative example) in that the former includes resistors RGD (RGD21 and RGD22 in FIG. 1).

Figure 8:
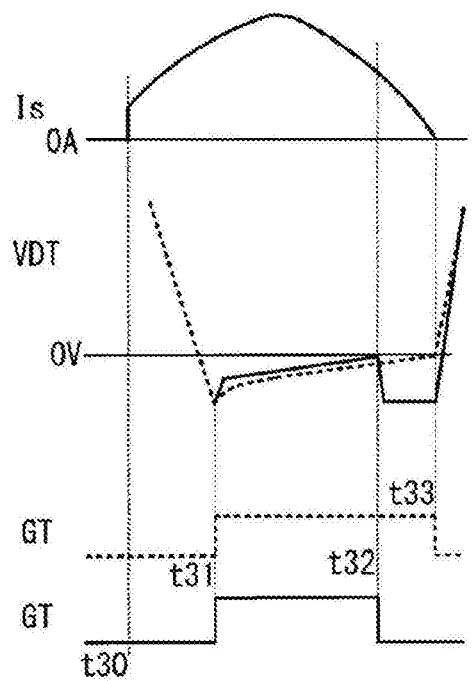
FIG. 8 is a timing chart showing an example of on/off control of the synchronous rectification transistors in the configuration according to the comparative example and the configuration according to the first embodiment when the load is a heavy load.

FIG. 8 is a timing chart showing an example of on/off control of the synchronous rectification transistors M in the configuration according to the comparative example shown in FIG. 4 and the configuration according to the present embodiment shown in FIG. 7 when the load is a heavy load.

When the resistance RD is large and the load is a heavy load, in the comparative example (FIG. 4) in which the resistance RGD is not provided, similar to FIG. 6 (solid line) described above, the waveform indicated by a broken line in FIG. 8 is obtained, and the backflow margin is reduced. On the other hand, in the present embodiment (FIG. 7) in which the resistor RGD is provided, when the resistor RD is large and the load is a heavy load, the fall of the drain terminal voltage VDT is detected at timing t31 shown in FIG. 8, the gate terminal voltage GT (solid line) rises, and the synchronous rectification transistor M is turned on, as in the comparative example (broken line). However, when the synchronous rectification transistor M is turned on, in this embodiment (FIG. 7), a voltage obtained by dividing the gate voltage VG by the resistors RGD and RD is added to the drain terminal voltage VDT. Thus, the drain terminal voltage VDT shown by a solid line in FIG. 8 shifts on the 0V side from the drain terminal voltage VDT (broken line) according to the comparative example, and is higher than the second threshold voltage VthB at timing t32 before timing t33. Here, the gate terminal voltage GT (solid line) falls and the synchronous rectification transistor M is turned off.

Therefore, with the configuration in which the resistor RGD is provided as in the present embodiment, when the resistor RD is large and the load is a heavy load, the turn-off timing of the synchronous rectification transistor M may be earlier than the timing at which the current Is begins to flow backward. That is, the backflow margin can be appropriately secured. Further, according to the present embodiment, by increasing the resistance RD, it is possible to optimize the turn-off timing of the synchronous rectification transistor M at a light load and to secure the backflow margin at a heavy load.

In the present embodiment, adding a voltage, which is obtained by dividing the gate voltage VG by the resistors RGD and RD, to the drain terminal voltage VDT when the synchronous rectification transistor M is turned on is equivalent to adding a voltage to the drain terminal voltage VDT by flowing a current corresponding to the resistor RGD through the resistor RD.

1-5. First Modification

Figure 9:
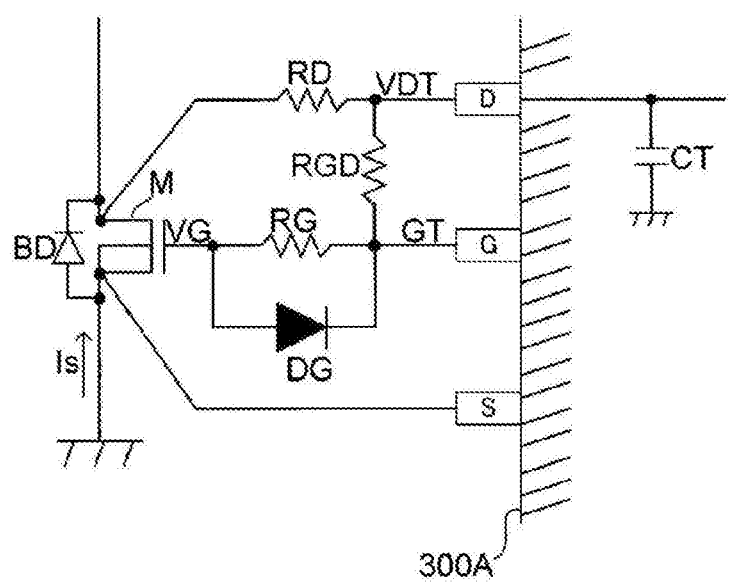
FIG. 9 is a view showing a configuration around a synchronous rectification transistor according to a first modification of the first embodiment.

FIG. 9 shows a configuration according to a first modification of the present embodiment. The configuration of FIG. 9 is different from the configuration of FIG. 7 described above in that a first end of a resistor RGD is connected between a first end of a resistor RG and a gate terminal G.

Figure 10:
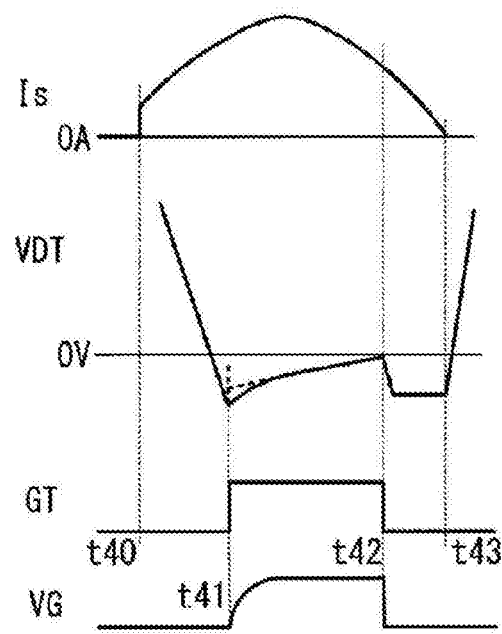
FIG. 10 is a timing chart showing an example of on/off control of the synchronous rectification transistors in the configuration according to the first embodiment and the configuration according to the first modification when the load is a heavy load.

As in a timing chart shown in FIG. 10 in the case where a resistance RD is large and the load is a heavy load in the configuration of FIG. 7, when it is detected at timing t41 that a drain terminal voltage VDT falls gently, a gate terminal voltage GT rises. At this time, a gate voltage VG rises relatively gently due to the resistance RG, as shown in FIG. 10. Therefore, in the configuration of FIG. 7, since a voltage obtained by dividing the gate voltage VG, which rises gently by the resistors RGD and RD, is added to the drain terminal voltage VDT, the drain terminal voltage VDT gradually approaches the 0V side as indicated by a solid line in FIG. 10.

On the other hand, in the case of the configuration of FIG. 9 according to the first modification, since the gate terminal voltage GT, which steeply rises at timing t41, is divided by the resistors RGD and RD, the drain terminal voltage VDT steeply approaches the 0V side as indicated by a broken line in FIG. 10. Thus, as indicated by a broken line in FIG. 10, an overshoot may occur in the drain terminal voltage VDT, the drain terminal voltage VDT may become higher than the second threshold voltage VthB, and the turned-on synchronous rectification transistor M may be turned off immediately.

In this way, although an effect of securing the backflow margin can also be obtained in the first modification, in order to prevent the synchronous rectification transistor M from being erroneously turned off, the configuration shown in FIG. 7 described above may be adopted.

1-6. Second Modification

Figure 11:
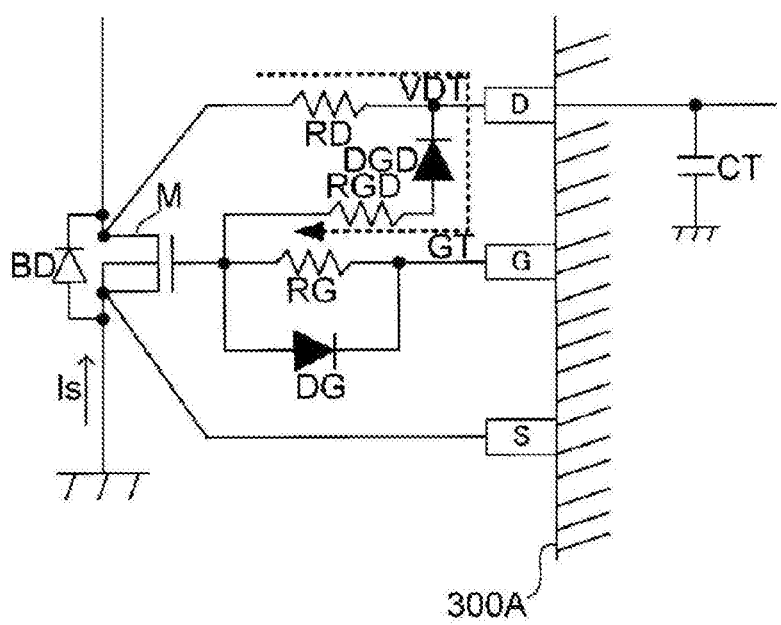
FIG. 11 is a view showing a configuration around a synchronous rectification transistor according to a second modification of the first embodiment.

FIG. 11 shows a configuration according to a second modification of the present embodiment. The configuration of FIG. 11 is different from the configuration of FIG. 7 described above in that a diode DGD is provided. Specifically, an anode of the diode DGD is connected to a second end of the resistor RGD, and a cathode of the diode DGD is connected between a second end of a resistor RD and a drain terminal D.

Figure 12:
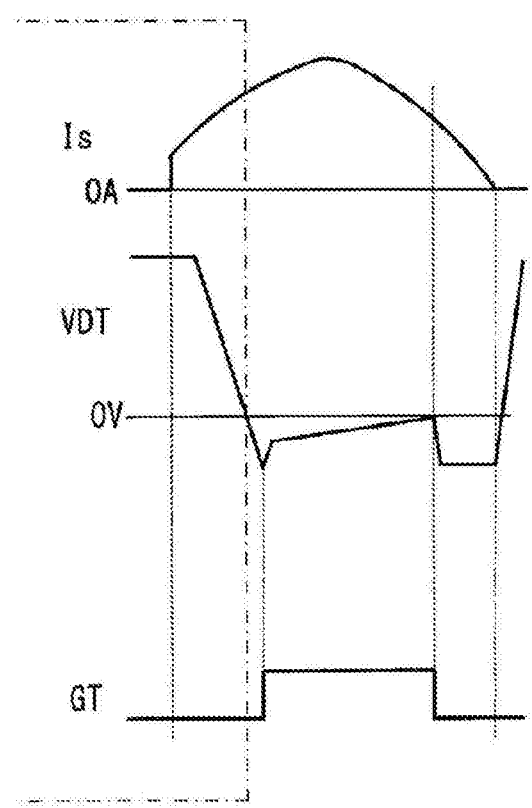
FIG. 12 is a timing chart showing an example of on/off control of the synchronous rectification transistor in the configuration according to the second modification when the load is a heavy load.

With such a configuration, in a range indicated by a dash-dot line in a timing chart shown in FIG. 12, that is, when a synchronous rectification transistor M is turned off and the drain terminal voltage VDT is 0V or higher, a current flowing through the resistance RGD indicated by a broken line in FIG. 11 can be suppressed by the diode DGD. Therefore, power consumption by the resistor RGD can be reduced.

Further, for the same purpose, a diode may be provided in the same manner as above for the resistor RGD in the configuration of FIG. 9 (first modification) described above.

1-7. Third Modification

Figure 13:
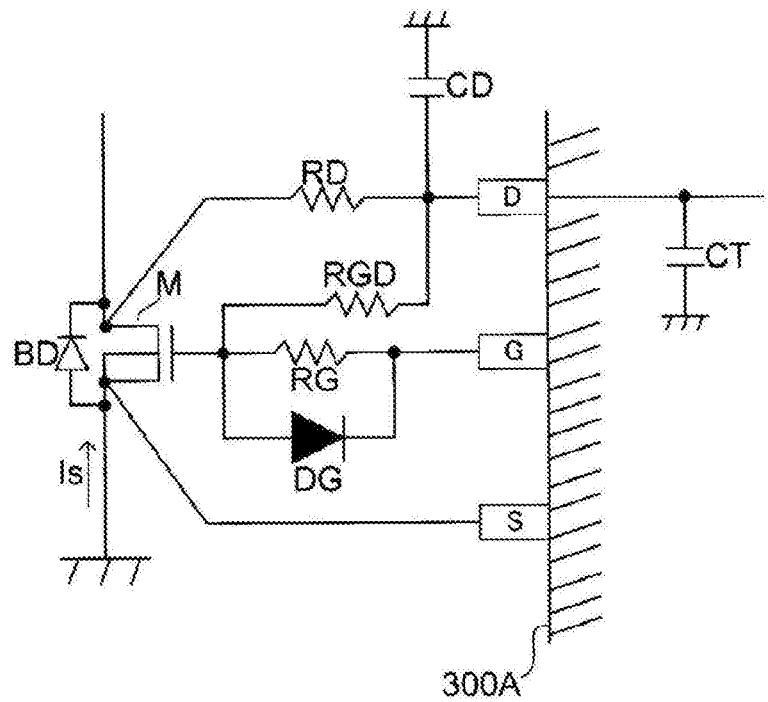
FIG. 13 is a view showing a configuration around a synchronous rectification transistor according to a third modification of the first embodiment.

FIG. 13 shows a configuration according to a third modification of the present embodiment. As shown in FIG. 13, as a capacitor forming an RC circuit (low pass filter) including a resistor RD, in addition to a terminal capacitor CT built in the synchronous rectification controller 300A, an external capacitor CD having one end connected between a second end of the resistor RD and a drain terminal D may be added. Further, the configuration of FIG. 13 may have a configuration in which the terminal capacitor CT is not provided.

1-8. Fourth Modification

Figure 14:
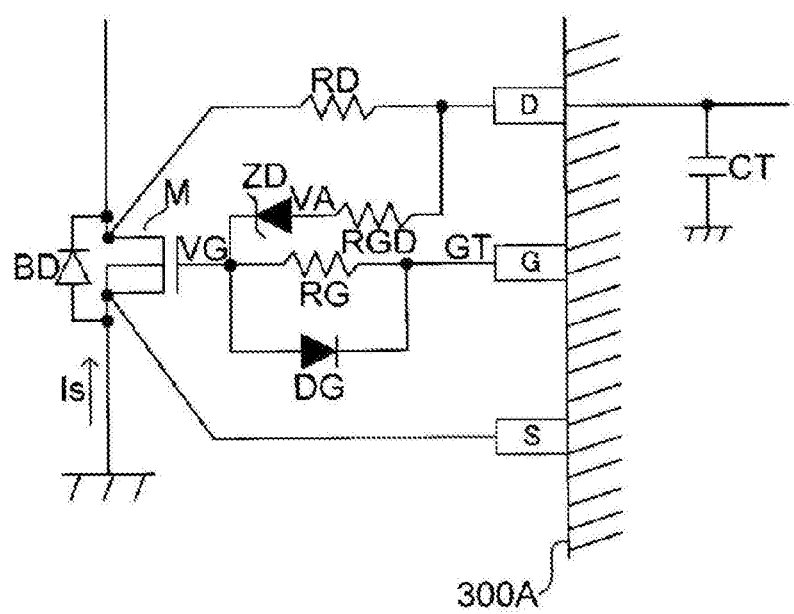
FIG. 14 is a view showing a configuration around a synchronous rectification transistor according to a fourth modification of the first embodiment.

FIG. 14 shows a configuration according to a fourth modification of the present embodiment. The configuration shown in FIG. 14 is different from the configuration of FIG. 7 described above in that a Zener diode ZD is provided. Specifically, an anode of the Zener diode ZD is connected to a first end of a resistor RGD, and a cathode of the Zener diode ZD is connected between a gate of a synchronous rectification transistor M and a second end of a resistor RG.

Figure 15:
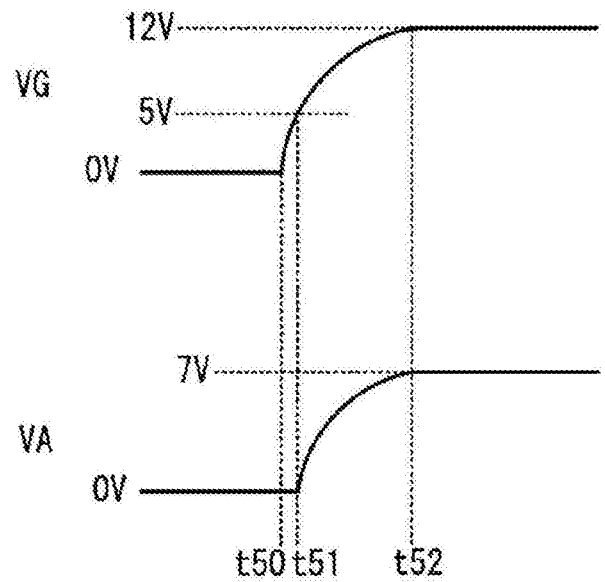
FIG. 15 is a timing chart showing an example of waveforms of a gate voltage and an anode voltage of a Zener diode in the configuration according to the fourth modification.

FIG. 15 shows an example of waveforms of a gate voltage VG and an anode voltage VA of the Zener diode ZD in the configuration shown in FIG. 14. As shown in FIG. 15, it is assumed that the gate voltage VG begins to rise at timing t50 due to a rise of a gate terminal voltage GT, and the gate voltage VG reaches, for example, 12V at timing t52. At this time, when the Zener voltage of the Zener diode ZD is, for example, 5V, the anode voltage VA begins to rise at timing t51 when the gate voltage VG reaches 5V. Then, at timing t52, the anode voltage reaches 7V, which is obtained by subtracting 5V from 12V.

In this way, a rising start timing of the anode voltage VA divided by the resistors RGD and a resistor RD can be delayed from t50 to t51.

2. Second Embodiment

Next, a second embodiment of the present disclosure will be described. This embodiment is a modification of the first embodiment described above, and specifically is different in the configuration of the synchronous rectification controller from the first embodiment.

Figure 16:
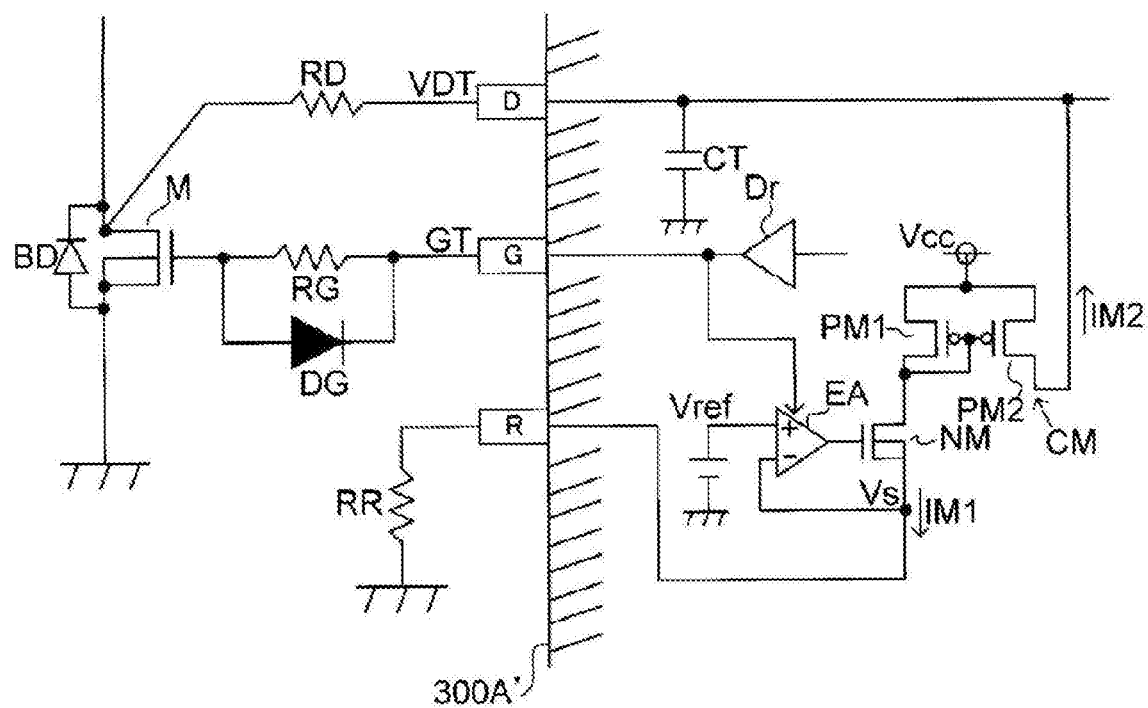
FIG. 16 is a view showing a configuration around a synchronous rectification transistor according to a second embodiment of the present disclosure.

FIG. 16 is a view showing a configuration around a synchronous rectification transistor M including a synchronous rectification controller 300A' according to the second embodiment. As shown in FIG. 16, the synchronous rectification controller 300A' according to the present embodiment includes a resistor terminal R for connecting an external resistor RR in addition to a drain terminal D and a gate terminal G.

Further, the synchronous rectification controller 300A' includes a driver Dr, an error amplifier EA, a transistor NM including an n-channel MOSFET, and a current mirror CM including transistors PM1 and PM2 including p-channel MOSFETs. A reference voltage Vref is applied to a non-inverting input terminal (+) of the error amplifier EA. An output end of the error amplifier EA is connected to a gate of the transistor NM. A source of the transistor NM is connected to an inverting input terminal (−) of the error amplifier EA and a resistor terminal R. A first end of the external resistor RR is connected to the resistor terminal R.

A drain of the transistor PM1 is connected to a drain of the transistor NM. A drain of the transistor PM2 is connected to the drain terminal D.

An operation of the configuration according to the present embodiment will be described. First, when a drain of the synchronous rectification transistor M steeply falls to a negative voltage when the synchronous rectification transistor M is turned off, a drain terminal voltage VDT smoothly falls by a low pass filter formed by a resistor RD and a terminal capacitor CT in the same way as in the first embodiment described above. Then, when the drain terminal voltage VDT becomes lower than the first threshold voltage VthA, the gate terminal voltage GT rises to a high level by the driver Dr, and the synchronous rectification transistor M is turned on.

When the gate terminal voltage GT rises, the error amplifier EA becomes active, and a source voltage Vs of the transistor NM is controlled to match the reference voltage Vref by driving the transistor NM by an output of the error amplifier EA. Therefore, a constant current IM1 flows through the transistor NM by the source voltage Vs and the resistor RR. Then, a current IM2 corresponding to the current IM1 flows through the transistor PM2 by the current mirror CM.

Therefore, a voltage is added to the drain terminal voltage VDT by the current IM2 flowing through the resistor RD. Therefore, in the same way as in the first embodiment described above, a timing at which the drain terminal voltage VDT becomes higher than a second threshold voltage VthB and the gate terminal voltage GT falls to a low level (turn-off timing of the synchronous rectification transistor M) can be advanced, thereby securing the backflow margin.

3. Third Embodiment

Figure 17:
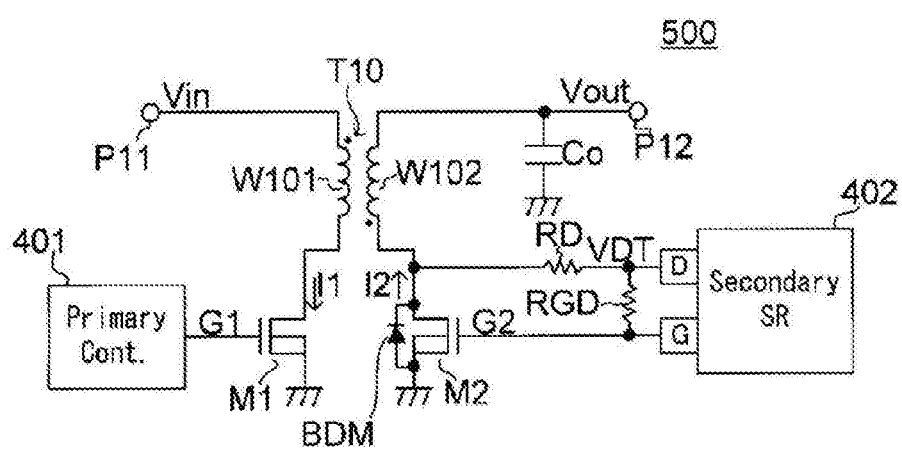
FIG. 17 is a circuit diagram of a DC/DC converter according to a third embodiment of the present disclosure.

The present disclosure can be applied not only to the LLC converter exemplified in the aforementioned embodiments but also to a fly-back converter. FIG. 17 is a circuit diagram of a DC/DC converter 500 according to a third embodiment of the present disclosure. The DC/DC converter 500 is an isolated synchronous rectification type DC/DC converter as a fly-back converter. The DC/DC converter 500 generates an output voltage Vout based on an input voltage Vin applied to an input terminal P11, and outputs the same from an output terminal P12.

The DC/DC converter 500 includes a primary winding W101 included in a transformer T10, a switching transistor M1, and a primary side controller 401 as a primary side configuration, and a secondary winding W102 included in the transformer T10, an output capacitor Co, a synchronous rectification transistor M2, a synchronous rectification controller 402, a resistor RD, and a resistor RGD as a secondary side configuration.

The input terminal P11 to which the DC input voltage Vin is applied is connected to a first end of the primary winding W101. A second end of the primary winding W101 is connected to a drain of a switching transistor M1. A source of the switching transistor M1 is connected to a grounded end.

A first end of the secondary winding W102 is connected to an output terminal P2. A second end of the secondary winding W102 is connected to a drain of the synchronous rectification transistor M2. A source of the synchronous rectification transistor M2 is connected to the grounded end. The output capacitor Co is connected between the output terminal P12 and the grounded end.

A first end of the resistor RD is connected to the drain of the synchronous rectification transistor M2. A second end of the resistor RD is connected to a drain terminal D of the synchronous rectification controller 402. A gate of the synchronous rectification transistor M2 is connected to a gate terminal G of the synchronous rectification controller 402. A first end of the resistor RGD is connected between the gate of the synchronous rectification transistor M2 and the gate terminal G. A second end of the resistor RGD is connected between the second end of the resistor RD and the drain terminal D.

Figure 18:
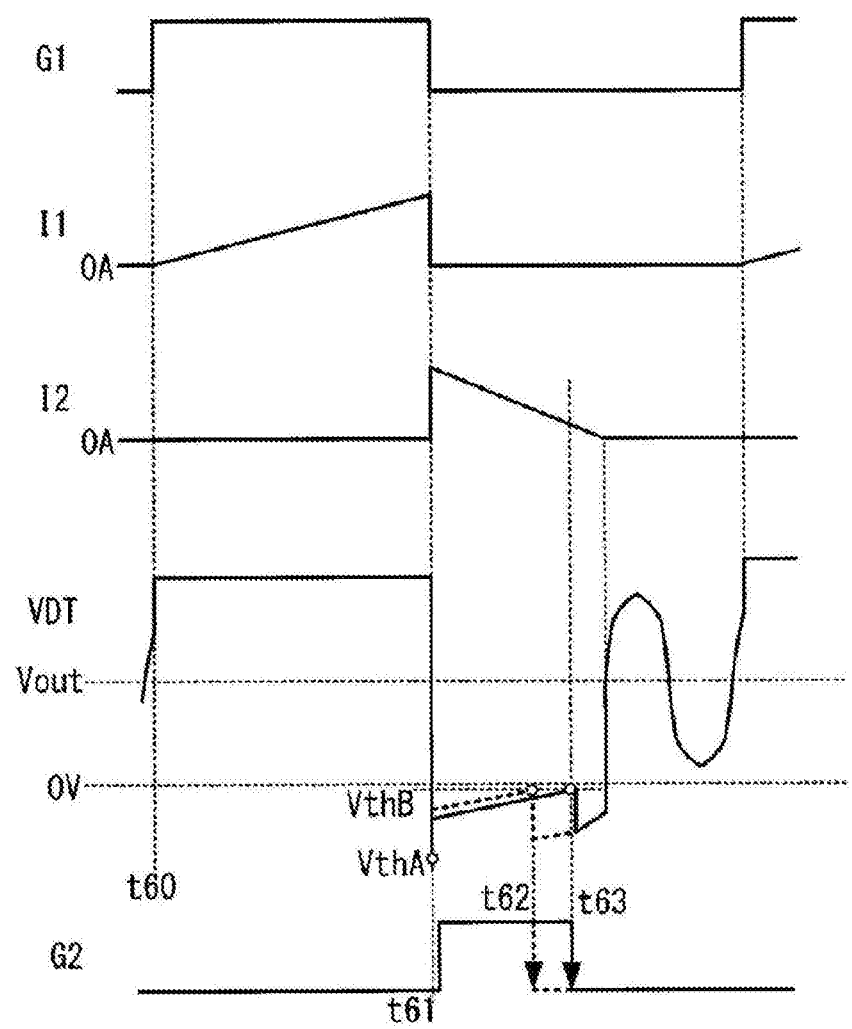
FIG. 18 is a timing chart showing an operation example of the DC/DC converter according to the third embodiment.

An operation of the DC/DC converter 500 having such a configuration will be described with reference to a timing chart shown in FIG. 18. FIG. 18 shows a gate voltage G1 applied to the gate of the switching transistor M1 from the primary side controller 401, a primary side current I1 flowing through the switching transistor M1, a secondary side current I2 flowing through the synchronous rectification transistor M2, and a drain terminal voltage VDT and a gate voltage G2 applied to the gate of the synchronous rectification transistor M2 from the synchronous rectification controller 402 in order from the top.

First, at timing t60, when the gate voltage G1 rises to a high level and the switching transistor M1 is turned on, the primary side current I1 begins to flow and increases with time. At this time, the drain terminal voltage VDT is higher than the output voltage Vout, and the secondary side current I2 does not flow.

Then, at timing t61, when the gate voltage G1 falls to a low level and the switching transistor M1 is turned off, the primary side current I1 does not flow, the drain terminal voltage VDT falls to a negative voltage, and the secondary side current I2 begins to flow through a body diode BDM of the synchronous rectification transistor M2 and decreases with time.

When the synchronous rectification controller 402 detects that the drain terminal voltage VDT becomes lower than the first threshold voltage VthA (for example, −100 mV), the gate voltage G2 rises to a high level and the synchronous rectification transistor M2 is turned on.

As a result, if the resistor RGD is not provided, the drain terminal voltage VDT rises with time after approaching the 0V side, as indicated by a solid line in FIG. 18. Then, at timing t63, when the synchronous rectification controller 402 detects that the drain terminal voltage VDT becomes higher than the second threshold voltage VthB (for example, −6 mV), the gate voltage G2 falls to a low level and the synchronous rectification transistor M2 is turned off.

On the other hand, with the configuration in which the resistor RGD is provided as in the present embodiment, when the synchronous rectification transistor M2 is turned on at timing t61, a voltage is added to the drain terminal voltage VDT by dividing the gate voltage G2 by the resistors RGD and RD. Therefore, as indicated by a broken line in FIG. 18, the drain terminal voltage VDT rises with time after being brought closer to the 0V side than in the case of the solid line. Thus, the drain terminal voltage VDT becomes higher than the second threshold voltage VthB at timing t62 prior to timing t63, and the gate voltage G2 falls. That is, the timing of turning off the synchronous rectification transistor M2 can be advanced, thereby securing the backflow margin.

The fly-back converter may be added with the configuration of the resistor RG and the diode DG as in the first embodiment described above, may be applied with the various modifications of the first embodiment described above, or may be applied with the synchronous rectification controller having the configuration as in the second embodiment described above.

4. Others

Although the embodiments of the present disclosure have been described above, the embodiments can be modified in various ways without departing from the spirit and scope of the present disclosure. For example, the embodiments described above may be implemented in suitable combination unless contradictory.

INDUSTRIAL AVAILABILITY

The present disclosure can be used in, for example, an LLC converter, a fly-back converter, or the like.

According to the present disclosure in some embodiments, it is possible to provide a synchronous rectification controller which is capable of properly securing a backflow margin.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A synchronous rectification controller that controls driving a synchronous rectification transistor arranged on a secondary side, comprising:
   a gate terminal capable of being electrically connected to a gate of the synchronous rectification transistor;
   a drain terminal capable of being electrically connected to a drain of the synchronous rectification transistor via a first resistor;
   a first comparator configured to compare a drain terminal voltage generated at the drain terminal with a negative first threshold voltage;
   a second comparator configured to compare the drain terminal voltage with a negative second threshold voltage higher than the negative first threshold voltage;
   a driver configured to perform an on/off control of the synchronous rectification transistor based on a result of the comparison by the first comparator and a result of the comparison by the second comparator;
   a resistor terminal capable of being connected to a first end of a second resistor;
   an error amplifier including a first input terminal to which a reference voltage is applied;
   a transistor including a control end to which an output end of the error amplifier is connected, and a first end connected to the resistor terminal together with a second input end of the error amplifier; and
   a current mirror configured to cause a current corresponding to a current flowing through the transistor to flow through the first resistor through the drain terminal,
   wherein the synchronous rectification controller is operable such that when the synchronous rectification transistor is turned on, a voltage is added to the drain terminal voltage by a current flowing through the first resistor according to the second resistor.

2. The synchronous rectification controller of claim 1, wherein the first end of the second resistor is capable of being electrically connected to the gate terminal, and
   wherein a second end of the second resistor is electrically connected between the first resistor and the drain terminal.

3. The synchronous rectification controller of claim 2, wherein the gate terminal is capable of being connected to a first end of a third resistor,
   wherein a second end of the third resistor is connected to the gate, and
   wherein the first end of the second resistor is electrically connected between the gate and the third resistor.

4. The synchronous rectification controller of claim 3, wherein a cathode of a first Zener diode is connected between the gate and the third resistor, and
   wherein an anode of the first Zener diode is connected to the first end of the second resistor.

5. The synchronous rectification controller of claim 2, wherein the gate terminal is capable of being connected to a first end of a third resistor,
   wherein a second end of the third resistor is connected to the gate, and
   wherein the first end of the second resistor is connected between the third resistor and the gate terminal.

6. The synchronous rectification controller of claim 2, wherein the second end of the second resistor is connected to an anode of a first diode, and
   wherein a cathode of the first diode is connected between the first resistor and the drain terminal.

7. The synchronous rectification controller of claim 1, wherein a first end of an external capacitor is connected between the first resistor and the drain terminal.

8. An isolated synchronous rectification type DC/DC converter comprising:
   the synchronous rectification controller of claim 1;
   the synchronous rectification transistor;
   the first resistor; and
   the second resistor.

9. The isolated synchronous rectification type DC/DC converter of claim 8, wherein the isolated synchronous rectification type DC/DC converter is an LLC converter.

10. The isolated synchronous rectification type DC/DC converter of claim 8, wherein the isolated synchronous rectification type DC/DC converter is a fly-back converter.

11. A synchronous rectification controller that controls driving a synchronous rectification transistor arranged on a secondary side, comprising:
    a gate terminal capable of being electrically connected to a gate of the synchronous rectification transistor;
    a drain terminal capable of being electrically connected to a drain of the synchronous rectification transistor via a first resistor;
    a first comparator configured to compare a drain terminal voltage generated at the drain terminal with a negative first threshold voltage;
    a second comparator configured to compare the drain terminal voltage with a negative second threshold voltage higher than the negative first threshold voltage; and a driver configured to perform an on/off control of the synchronous rectification transistor based on a result of the comparison by the first comparator and a result of the comparison by the second comparator, wherein the synchronous rectification controller is operable such that when the synchronous rectification transistor is turned on, a voltage is added to the drain terminal voltage by a current flowing through the first resistor according to a second resistor, wherein a first end of the second resistor is capable of being electrically connected to the gate terminal, wherein a second end of the second resistor is electrically connected between the first resistor and the drain terminal, and wherein the second end of the second resistor is directly connected to the drain terminal.

12. The synchronous rectification controller of claim 11, wherein the gate terminal is capable of being connected to a first end of a third resistor,
   wherein a second end of the third resistor is connected to the gate, and
   wherein the first end of the second resistor is electrically connected between the gate and the third resistor.

13. The synchronous rectification controller of claim 12, wherein a cathode of a first Zener diode is connected between the gate and the third resistor, and
wherein an anode of the first Zener diode is connected to the first end of the second resistor.

14. The synchronous rectification controller of claim 11, wherein the gate terminal is capable of being connected to a first end of a third resistor,
   wherein a second end of the third resistor is connected to the gate, and
   wherein the first end of the second resistor is connected between the third resistor and the gate terminal.

15. The synchronous rectification controller of claim 11, wherein the second end of the second resistor is connected to an anode of a first diode, and
   wherein a cathode of the first diode is connected between the first resistor and the drain terminal.

16. The synchronous rectification controller of claim 11, wherein a first end of an external capacitor is connected between the first resistor and the drain terminal.

17. An isolated synchronous rectification type DC/DC converter comprising:
   the synchronous rectification controller of claim 11;
   the synchronous rectification transistor;
   the first resistor; and
   the second resistor.

18. The isolated synchronous rectification type DC/DC converter of claim 17, wherein the isolated synchronous rectification type DC/DC converter is an LLC converter.

19. The isolated synchronous rectification type DC/DC converter of claim 17, wherein the isolated synchronous rectification type DC/DC converter is a fly-back converter.

* * * * *